United States Patent [19]

Kato et al.

[11] Patent Number: 4,667,531
[45] Date of Patent: May 26, 1987

[54] CAM MECHANISM

[75] Inventors: Heizaburou Kato, Ichikawa; Yukihisa Maruyama, Kikukawa, both of Japan

[73] Assignee: Sankyo Manufacturing Company, Ltd., Tokyo, Japan

[21] Appl. No.: 573,683

[22] Filed: Jan. 25, 1984

[30] Foreign Application Priority Data

Sep. 7, 1983 [JP] Japan ............................ 58-163189
Sep. 16, 1983 [JP] Japan ............................ 58-169407
Sep. 26, 1983 [JP] Japan ............................ 58-176410

[51] Int. Cl.$^4$ .................. F16H 53/00; B23P 23/00; B23Q 1/04; B66C 23/00
[52] U.S. Cl. ............................... 74/567; 74/813 R; 29/38 C; 29/564.1; 269/66; 269/233; 408/35; 414/744 R
[58] Field of Search ............... 74/567, 8 BR, 596, 834, 74/813 R, 813 C, 813 L, 828, 522, 53, 57; 123/90.17, 90.18, 90.6, 99–105, 90.27; 228/112, 113, 114, 2; 384/129, 320; 156/73.5; 269/66, 233; 29/33 J, 38 C, 564.1; 408/35; 409/172; 414/744 R, 752, 749

[56] References Cited

U.S. PATENT DOCUMENTS

| 12,999 | 6/1855 | Dietz et al. .......................... 74/53 |
| 22,977 | 2/1859 | Ray ..................................... 74/53 |
| 1,980,527 | 11/1934 | Hewton ............................... 74/53 |
| 2,070,633 | 2/1937 | Topham ............................... 74/53 |
| 2,692,509 | 10/1954 | Gibson ................................. 74/53 |
| 2,710,323 | 6/1955 | Andrews .............................. 74/53 |
| 2,872,853 | 2/1959 | Hoern .................................. 74/53 |
| 3,135,123 | 6/1964 | Spanke et al. ........................ 74/53 |
| 3,385,595 | 5/1968 | Benatar et al. ....................... 74/53 |
| 3,811,330 | 5/1974 | Weichhand et al. ................. 74/53 |
| 4,523,889 | 6/1985 | Orii ................................... 414/752 |

FOREIGN PATENT DOCUMENTS

| 1024600 | 4/1953 | France ................................ 74/53 |
| 55-4978 | 1/1980 | Japan . |
| 577981 | 6/1946 | United Kingdom ................. 74/53 |

Primary Examiner—Gary L. Smith
Assistant Examiner—Vinh Luong
Attorney, Agent, or Firm—Wenderoth, Lind & Ponack

[57] ABSTRACT

A cam mechanism includes a continuous rotary shaft connected to a drive source, a cam fixed on the rotary shaft to convert each continuous rotation motion of the rotary shaft to a compound horizontal and vertical motion, and an output member coupled with the cam. The cam comprises a single piece, disc-shaped compound cam having in its upper surface an endless groove formed of continuously-arranged arcuate and non-arcuate groove portions and an endless guide the depth of which from the upper surface of the compound cam varies continuously. The output member is supported displaceably in the horizontal and vertical directions relative to the compound cam and includes at least one roller engaged with the groove and the guide of the compound cam.

9 Claims, 14 Drawing Figures

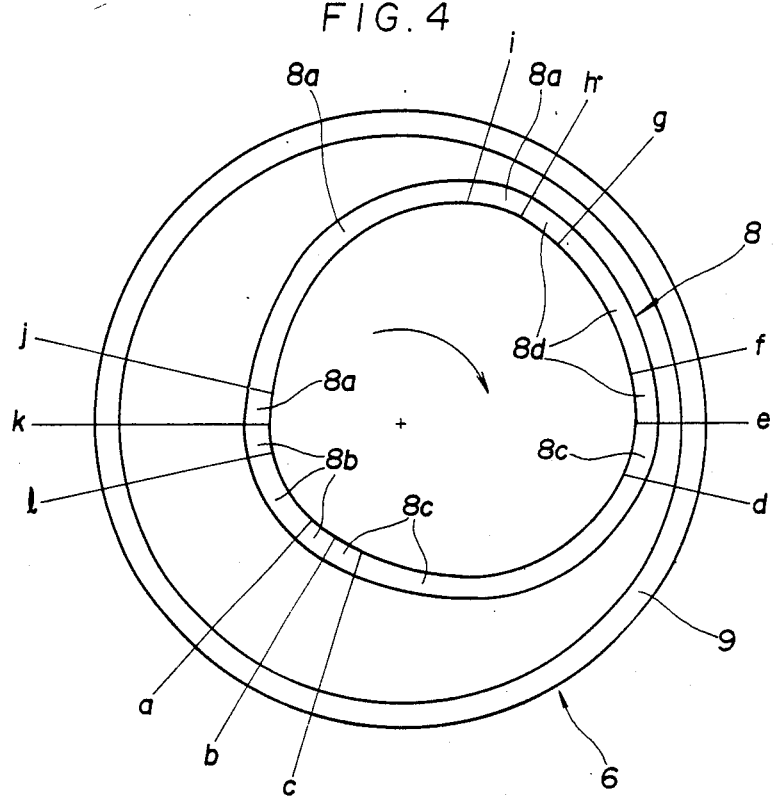
FIG. 4
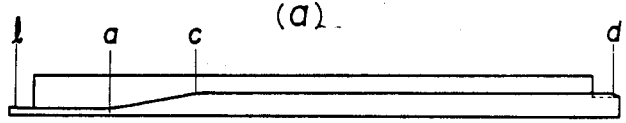
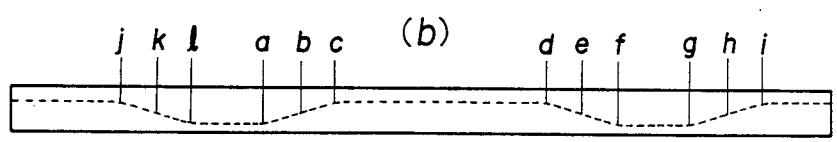
FIG. 5

CAM MECHANISM

BACKGROUND OF THE INVENTION (1) Field of the Invention

This invention relates to a cam mechanism suitable for use in a variety of apparatus which can automatically carry out assembly, machining, feeding, conveyance, ejection and various other operations, and more specifically to a cam mechanism adapted to convert a continuous rotary motion into a compound motion which consists of two linear motions, one being in the horizontal direction and the other in the vertical direction.

(2) Description of the Prior Art

As a cam mechanism which was proposed before by the same applicant and is of the same type as that of this invention, there is a cam mechanism pertaining to the invention disclosed in Japanese Patent Publication No. 4978/1980. In the cam mechanism disclosed in the above-referred to Japanese Patent Publication No. 4978/1980, especially in FIG. 1 of the publication, an input shaft is supported rotatably on a housing, a first and second globoidal cams are fixedly arranged close to each other on the input shaft, each of the globoidal cams is provided with a tapered rib having a predetermined geometrical profile, first and second driven shafts corresponding respectively to the first and second globoidal cams are rotatably supported on the housing in such a way that the driven shafts are perpendicular to the input shaft and are parallel to each other, first and second driven turrets are fixedly attached respectively to the first and second driven shafts, each of the driven turrets is provided on the periphery thereof with a cam follower which holds the tapered rib of its corresponding globoidal cam from both sides thereof, and the first and second driven shafts are fixedly provided with respective arms, whereby to cause an output member to undergo a compound motion consisting of two linear motions.

However, such a cam mechanism is accompanied by such problems as complex structure, size-up, cost-up and the like because use of two globoidal cams is essential and parts are hence increased in number.

These problems become serious particularly when the cam mechanism is used as or incorporated in a base machine for a machine tool adapted to carry out automatically multistep operations such as assembly and/or machining of various works or workpieces. The term "base machine" as used herein means a drive mechanism which constitutes the principal part of an automatic assembly (and/or machining) apparatus adapted to feed and place a variety of works successively at prescribed positions on an intermittently-rotating index table and then to assemble and/or machine the thus-placed works.

Such a base machine generally includes a plurality of pick-and-place units for feeding or ejecting various works to or from the index table. Each of the pick-and-place units is designed in such a way that it undergoes a compound motion consisting in combination of a horizontal linear motion and a vertical linear motion. However, base machines which have publicly been provided are each equipped with a drive source for the index table and additional drive sources respectively for individual pick-and-place units, leading to complexity and size-up of overall systems. These problems may principally be attributed to the complexity and size-up of a mechanism which serves to convert each continuous rotary motion from each drive source to a compound motion and to transmit the compound motion to its corresponding output member, namely, pick-and-place unit. Thus, an attempt to drive both index tables and pick-and-place units by a single drive source resulted in further complexity and size-up because it required the provision of a number of gears and motion convertors.

SUMMARY OF THE INVENTION

An object of this invention is thus to provide a cam mechanism which has a simpler and smaller structure compared with conventional cam mechanisms and is capable of converting each continuous rotary motion of a continuous rotary shaft to a compound horizontal and vertical motion.

Another object of this invention is to provide a cam mechanism in which a single piece cam, which is connected to a single drive source, is able to have a plurality of output members to undergo prescribed compound motions.

A further object of this invention is to provide a cam mechanism which is suitable to enable each output member to undergo a pick-and-place motion.

A still further object of this invention is to provide a cam mechanism which is suitable particularly for use as a base machine in each of various automatic assembling machines or automatic machining apparatus.

In one aspect of this invention, there is provided a cam mechanism including a continuous rotary shaft connected to a drive source and driven continuously and rotatively by the drive source, cam means secured fixedly with the continuous rotary shaft and adapted to convert each continuous rotary motion of the continuous rotary shaft to a compound horizontal and vertical motion, and an output member coupled with the cam means and adapted to receive the compound horizontal and vertical motion transmitted thereto, characterized in that the cam means comprises a single piece disc-shaped compound cam, the disc-shaped compound cam has in the upper surface thereof an endless groove formed of continuously-arranged arcuate and non-arcuate groove portions and an endless guide means the depth of which from an upper surface of the compound cam varies continuously, and the output member is supported displaceably in the horizontal and vertical directions relative to the compound cam and includes at least one roller engaged with the groove and the guide means of the compound cam.

The guide means of the compound cam may comprise a circular groove formed in a peripheral edge portion of the upper surface of the compound cam, a bottom wall of the circular groove having deep wall portions, shallow wall portions and tilted wall portions connecting the deep and shallow wall portions continuously. The output member may have a first and second rollers, the first roller being in rotatable engagement with the endless groove displaceably in the vertical direction, and the second roller being in rotatable engagement with the circular groove while being kept in contact with the bottom wall of the circular groove.

Alternatively, the guide means may comprise a bottom wall of the endless groove, the bottom wall having deep wall portions, shallow wall portions and tilted wall portions connecting the deep and shallow wall portions continuously. The output member may have a single roller which is in rotatable engagement with the groove while being kept in contact with the bottom wall.

Preferably, the output member further includes a fixed rod extending in the vertical direction, a sliding block supported displaceably up and down on the fixed rod and biased downwardly, and a guide rod supported slidably in the horizontal direction by the sliding block.

More preferably, the output member is supported by a support table fixed on one end of a hollow sleeve within which the continuous rotary shaft is rotatably disposed. An intermittent rotary shaft which is intermittently rotated by intermittent drive means may be supported outside of the hollow sleeve, and an index table may be fixed on the intermittent rotary shaft.

Further objects and features of the present invention will become apparent from the following detailed description of the invention and preferred embodiments thereof, when taken in conjunction with the accompanying drawings.

BRIEF DESCRIPTION OF THE DRAWINGS

In the accompanying drawings:

FIG. 4 is a schematic top plan view of a compound cam;

FIG. 5(a) is a side view of the compound cam of FIG. 4;

FIG. 5(b) is a schematic development of a circular cam;

DETAILED DESCRIPTION OF THE INVENTION AND PREFERRED EMBODIMENTS

Preferred embodiments of this invention will hereinafter be described in detail with reference to the accompanying drawings. In the following embodiments, description will be made on cam mechanisms in which output members are pick-and-place units. It should however be borne in mind that output members in the present invention are not necessarily limited to such pick-and-place units but a variety of output members, which require such compound motions as will be described below, may be employed.

Figure 1:
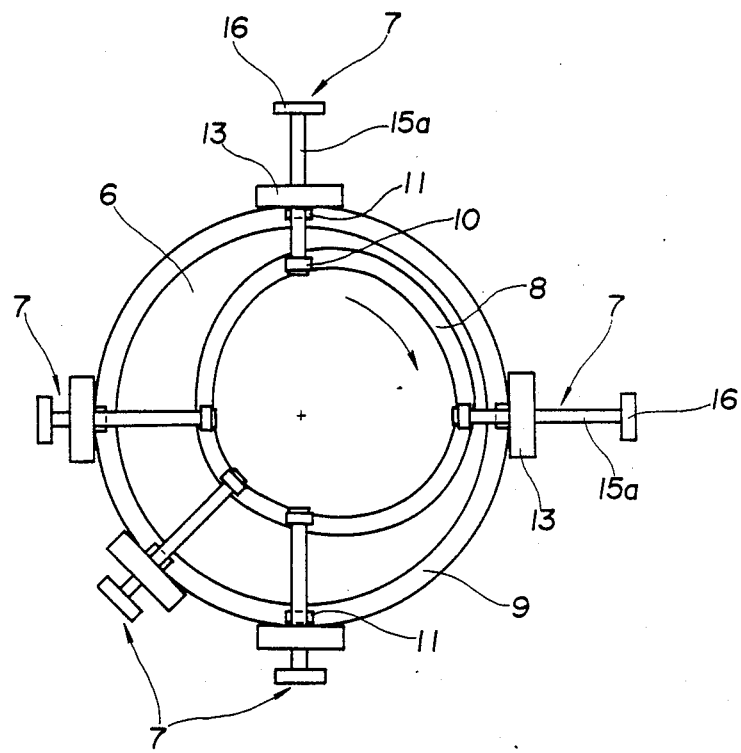
FIG. 1 is a top plan view of a cam mechanism according to one embodiment of this invention.
Figure 2:
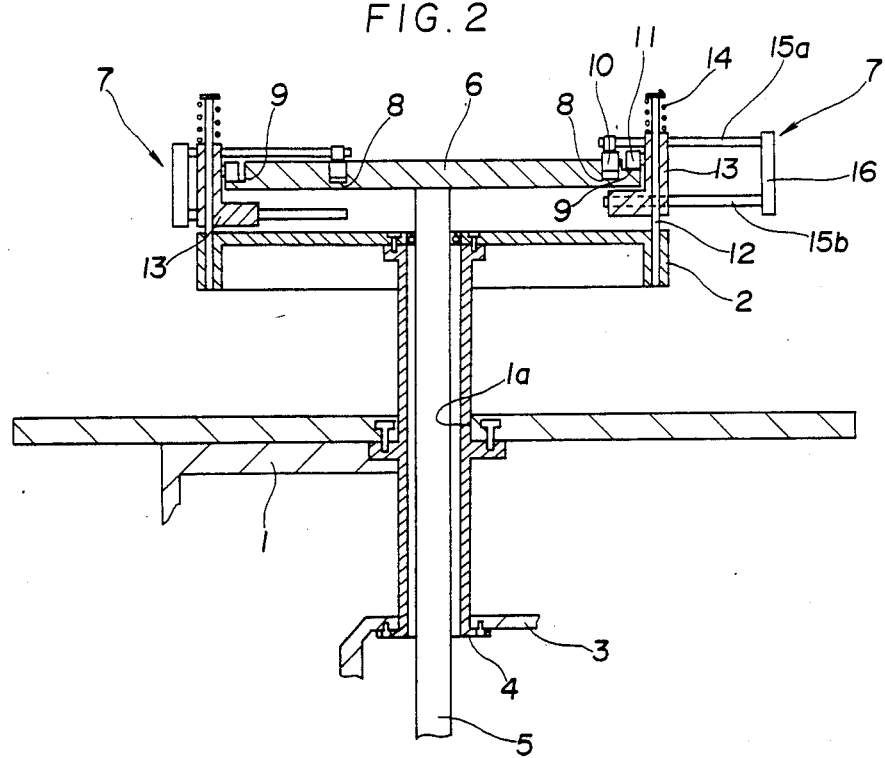
FIG. 2 is a vertical cross-sectional view of the cam mechanism of FIG. 1.
Figure 3:
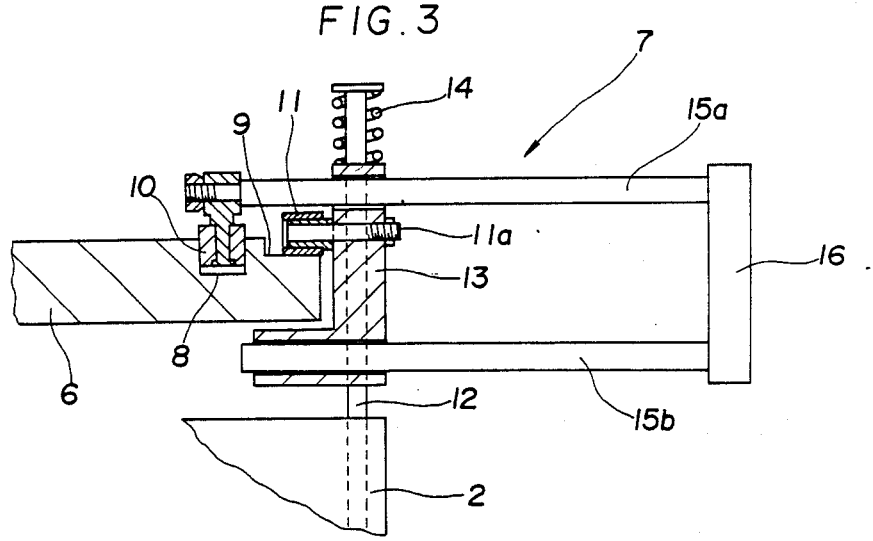
FIG. 3 is an enlarged fragmentary cross-sectional view of the cam mechanism of FIG. 1.

FIGS. 1 and 2 show one embodiment of this invention, in which a cam mechanism of this invention is applied to pick-and-place units. The cam mechanism has a housing 1, a fixed hollow sleeve 4 fixed at the outer periphery thereof in an opening 1a of the housing 1, fixing and supporting at the upper end thereof an output member holding table 2 and fixedly supported at the lower end thereof by a fixing member 3, a continuous rotary shaft 5 disposed axially through the inner hollow portion of the fixed sleeve 4, a disc-shaped compound cam 6 fixedly supported on the upper end of the continuous rotary shaft 5, and output members, namely, pick-and-place units 7 fixed on the holding table 2. In the upper surface of the compound cam 6, there are formed an endless and non-circular grooved cam 8 and a circular cam 9 positioned radial-outwardly of the grooved cam 8 and formed along an outer peripheral edge portion of the upper surface. The grooved cam 8 and circular cam 9 are respectively in engagement with first rollers 10 and second rollers 11 of the plurality of pick-and-place units 7 fixed at predetermined positions on the holding table 2, thereby allowing the rollers 10,11 to roll along the cams 8,9 respectively.

As shown most clearly in FIGS. 4 and 5, the grooved cam 8 comprises a small-diametered arcuate portion 8b, a large-diametered arcuate portion 8d, and non-arcuate portions 8a,8c. On the other hand, the circular cam 9 has a bottom wall which has deep portions (periods l–a and f–g), shallow portions (periods c–d and i–j) and tilted portions (periods j–l, a–c, d–f and g–i). The first rollers 10 are movable up and down within the grooved cam 8 whereas the second rollers 11 roll while kept in contact with the bottom wall of the circular cam 9.

Each of the pick-and-place units 7 has a vertical rod 12 fixed on the holding table 2, an L-shaped sliding block 13 supported slidably up and down on the fixed rod 12 in such a way that the fixed rod 12 extends through the sliding block 13, a spring 14 hooked at one end thereof on the upper end of the fixed rod 12 and biasing the sliding block 13 downwardly toward the holding table 12, and a pair of guide rods 15a,15b supported slidable leftwards and rightwards through the sliding block 13 and extending in the horizontal direction, i.e. in a direction parallel to the surface of the compound cam 6. The pair of guide rods 15a,15b are arranged in up-and-down positional relationship along a straight line passing diametrically through the central axis of rotation of the compound cam 6. At radially distal end portions of the guide rods 15a,15b, there is fixedly provided a mounting block 16 adapted to attach one of various chuck means (not shown). On a radially proximal end portion of the upper guide rod 15a, there is provided the first roller 10 which rolls in the grooved cam 8. The second roller 11, which rolls in the circular cam 9, is mounted on the inner surface of the sliding block 13 by means of a shaft 11a. Since the first roller 10 rolls on an orbit determined by the non-circular grooved cam 8 as depicted in FIG. 4, it is possible to have the mounting block 16 move inwardly and outwardly in radial directions. The second roller 11 rolls in an orbit along the circular cam 9 and, hence, the second roller 11 by itself does not cause the mounting block 16 to move inwardly and outwardly in radial directions. As illustrated in FIG. 5, however, the second roller 11 moves up and down corresponding to the profile of the bottom wall of the circular cam 9 and displaces the sliding block 13 and mounting block 16 up and down. Thus, the radial reciprocation of the guide rods 15a,15b and the vertical reciprocation of the sliding block 13 are synthesized, thereby making it possible to cause the mounting block 16 to undergo a desired pick-and-place motion.

Figure 6:
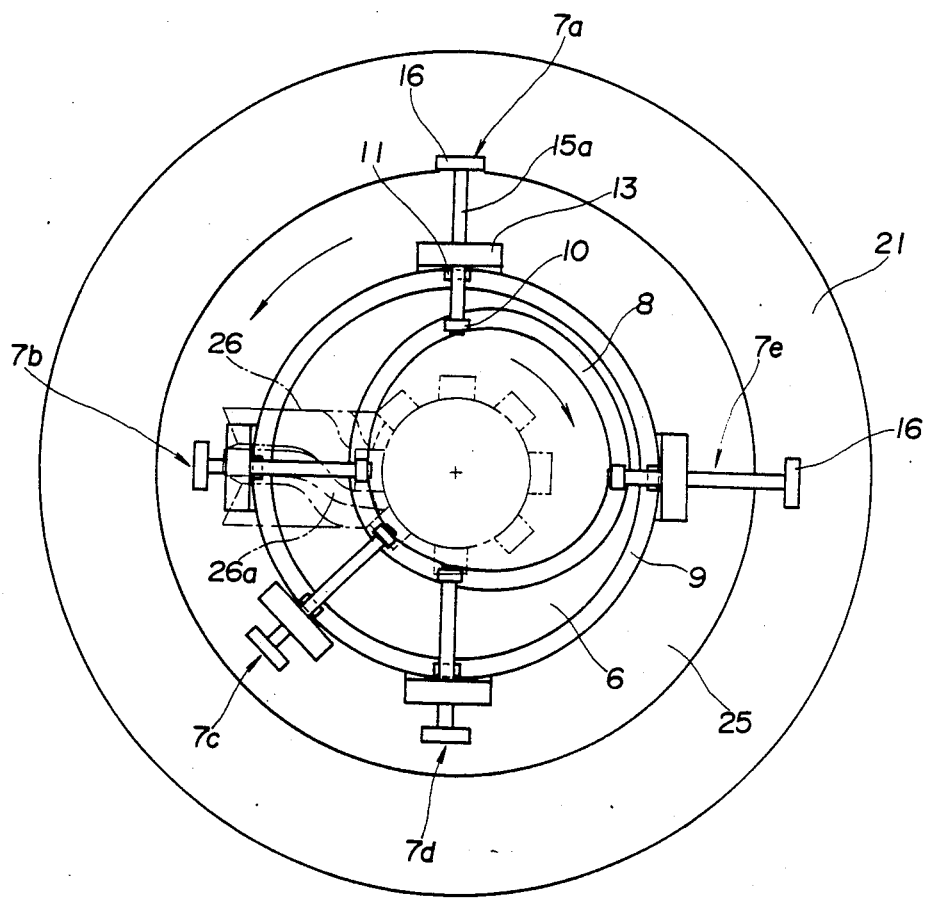
FIG. 6 is a top plan view of a cam mechanism according to the second embodiment of this invention.
Figure 7:
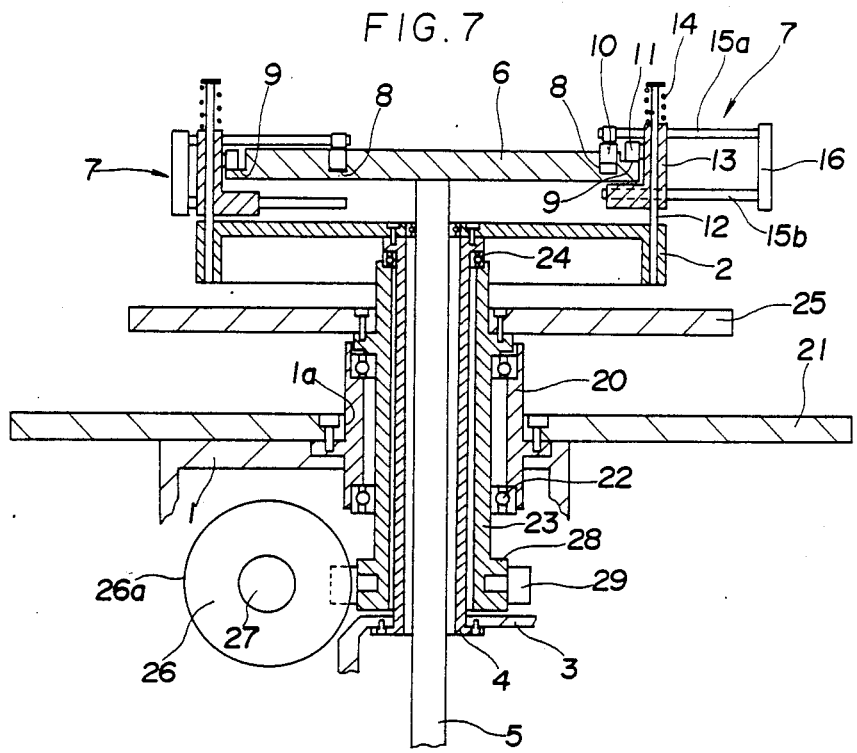
FIG. 7 is a vertical cross-sectional view of the cam mechanism of FIG. 6.

A cam mechanism having such a structure as described above is preferably applied to a base machine. FIGS. 6 and 7 illustrate one example of such applications. Needless to say, these drawings should not be interpreted in such a manner that the cam mechanism of this invention must always be used as the base machine depicted in the drawings. In the illustrated example, the mechanism has a cylinder 20 fixed in the opening 1a formed in the housing 1. On the outer peripheral surface of the cylinder 20, a fixed table 21 is provided perpendicularly with the axis of the cylinder. Inside the cylinder 20, there are disposed an intermittently-rotating hollow shaft 23 supported by bearings 22 rotatably relative to the cylinder 20. The shaft 23 is also rotatable relative to a fixed sleeve 4 owing to the provision of bearings 24 therebetween. Above the fixed table 21, an index table 25 is placed parallelly to the fixed table 21. The index table 25 is fixed on the shaft 23 and intermittently rotated together with the shaft 23. As means for causing the shaft 23 to undergo intermittent rotation, a globoidal cam 26 is used in the illustrated mechanism. However, other solid cams, for example, a barrel cam may also be employed. Alternatively, other conversion means may also be used. The globoidal cam 26 has, on its outer peripheral surface, a rib 26a which has been designed to give prescribed intermittent rotation to the shaft 23. The globoidal cam 26 is driven continuously by a camshaft 27 which is connected to the same drive source (not illustrated) as that adapted to drive the continuous rotary shaft 5. A hollow turret 28 is provided, as a unitary member, on the lower end of the shaft 23. A plurality of cam followers 29 which are provided with the same interval on the outer peripheral surface of the hollow turret 28 roll in contact with the rib 26a, thereby transmitting the continuous rotation of the globoidal 26 as a unidirectional intermittent rotation to the shaft 23.

Figure 8:
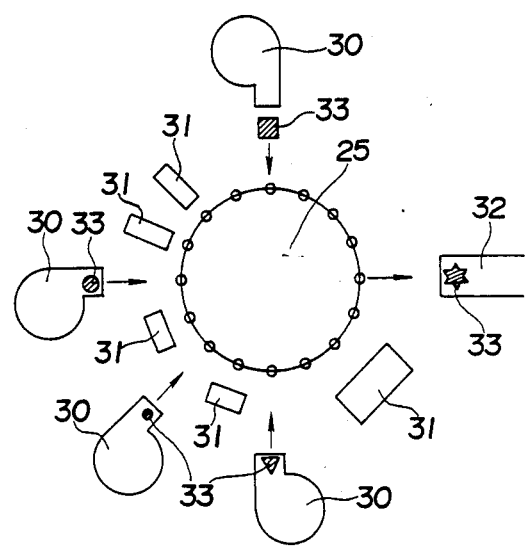
FIG. 8 is a schematic illustration for explaining an automatic assembly/machining apparatus in which the cam mechanism of FIG. 6 can be incorporated.

FIG. 8 is a schematic illustration showing an automatic assembly machine in which the above-described cam mechanism has been incorporated. Various works workpieces, which are indicated by numeral 33 in the drawing, are conveyed from feeders 30, which are arranged respectively outside intermittent stoppage positions of the index table 25, onto the table 25 by means of the above-described pick-and-place units 7 (not illustrated in FIG. 8). Outside other stoppage positions of the table 25, assembly machines and/or machining apparatus 31 are arranged, whereby performing prescribed work on the works while the table is stopped. Numeral 32 indicates an ejection path. Works, which have passed through all the steps, are conveyed from the table 25 onto the ejection path by means of a pick-and-place unit 7.

For the sake of convenience in description, it is now supposed that the index table 25 intermittently rotates over an angle of 22.5° in the counterclockwise direction and the compound cam 6 undergoes one single clockwise revolution after the index table 25 has stopped after turning over 22.5° and before the index table 25 begins the next turning motion. The rotation of the compound cam 6 and the operation of the pick and-place 7 induced by the rotation of the compound cam 6 will next be described in detail with reference to the timing chart shown in FIG. 9.

Figure 9:
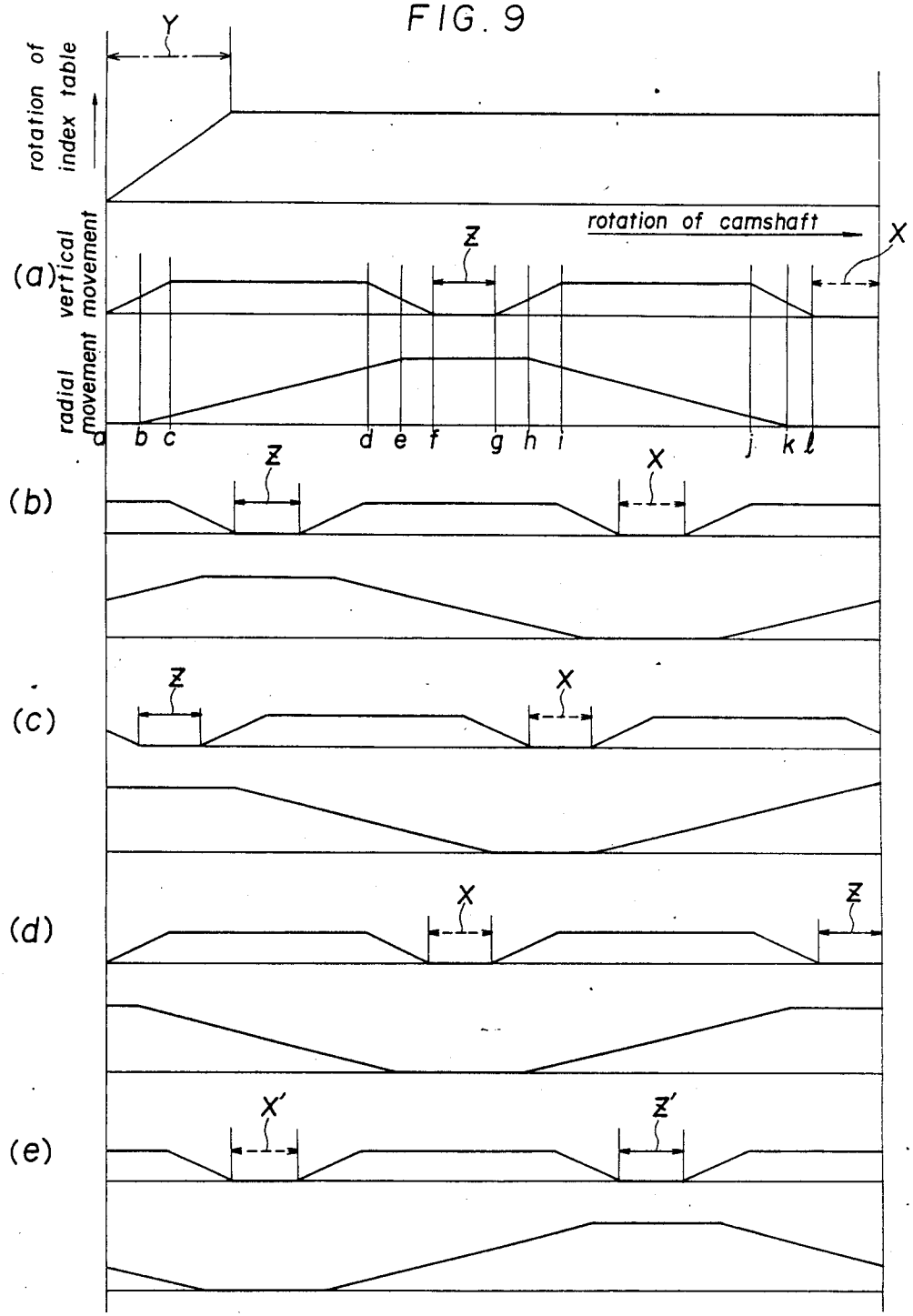
FIG. 9 is a timing diagram for explaining the operation of the cam mechanism of FIG. 6, the uppermost graph showing intermittent rotation of an index table, and the remaining graphs (a)–(e) illustrating the operations of output members 7a–7e respectively.
Figure 10:
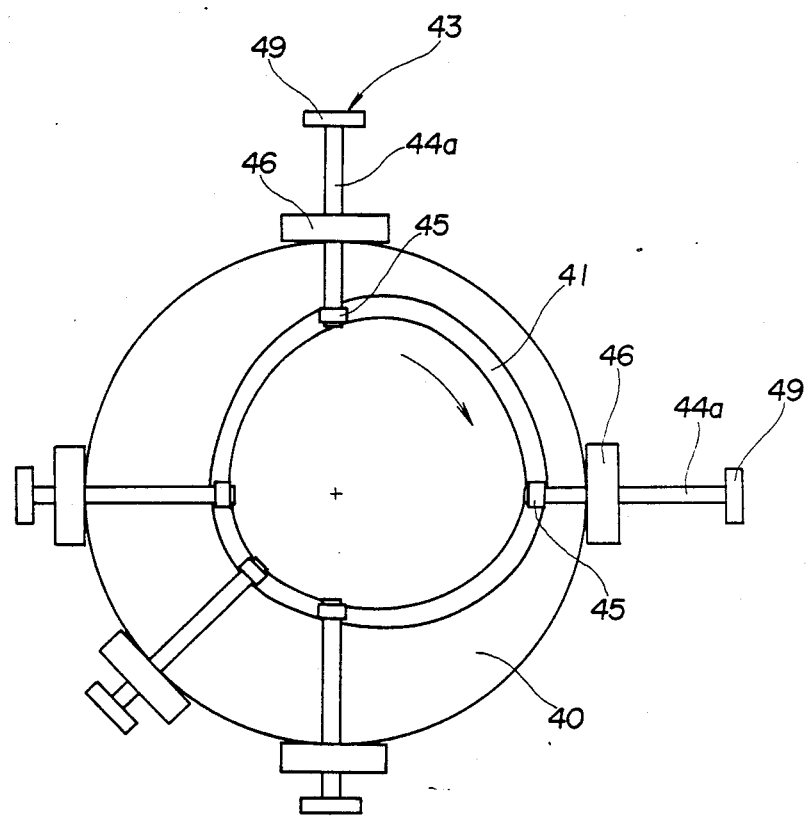
FIG. 10 is a top plan view of a cam mechanism according to the third embodiment of this invention.
Figure 11:
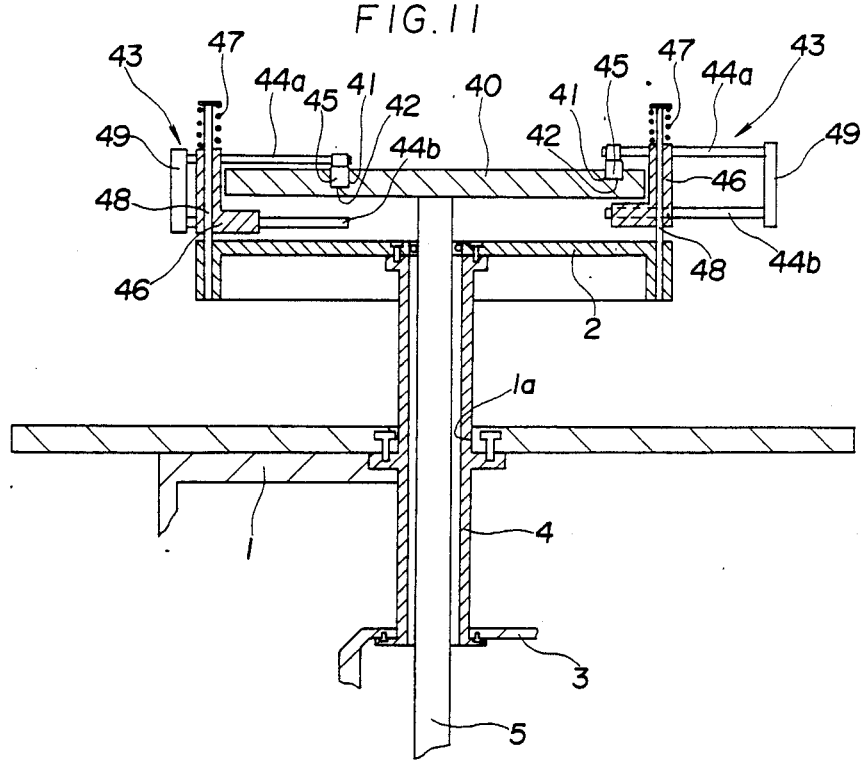
FIG. 11 is a vertical cross-sectional view of the cam mechanism of FIG. 10.
Figure 12:
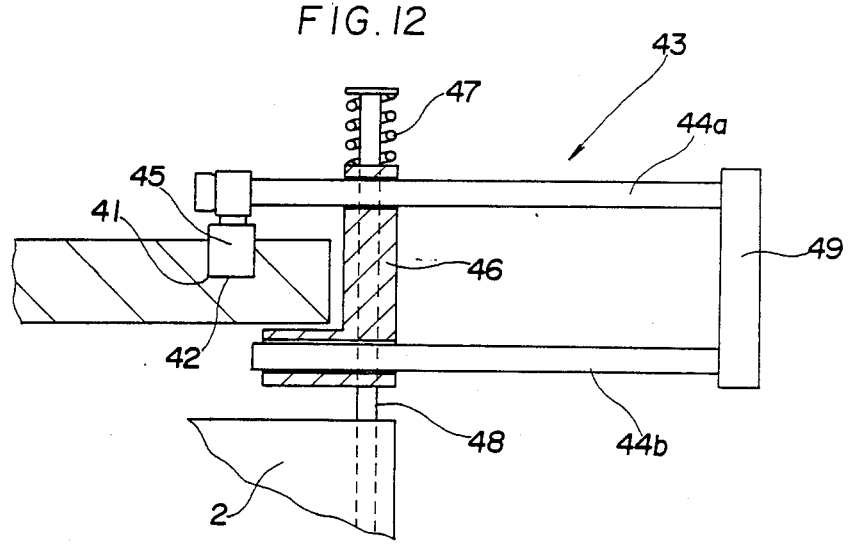
FIG. 12 is an enlarged fragmentary cross-sectional view of the cam mechanism of FIG. 10.
Figure 13:
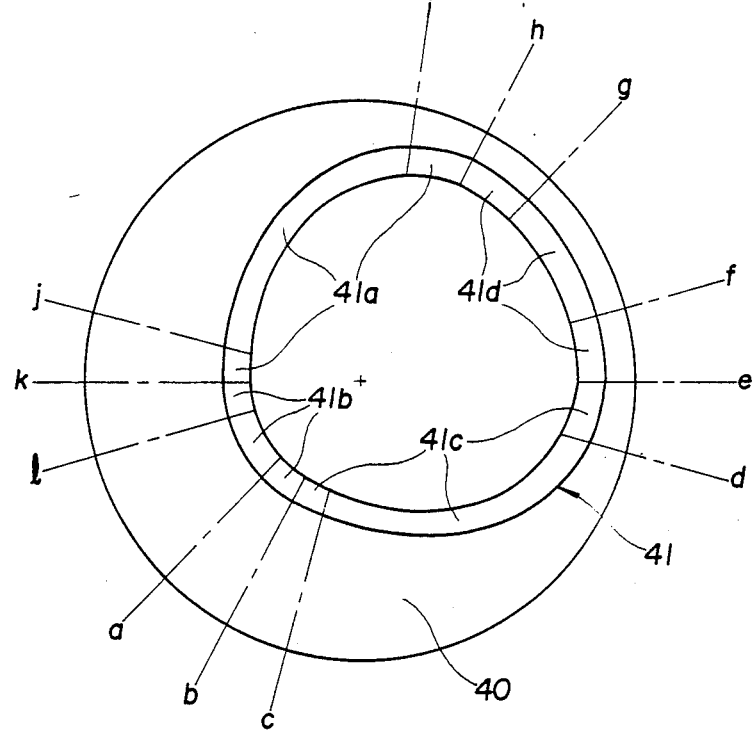
FIG. 13 is a top plan view for explaining a compound cam used in the cam mechanism of FIG. 10.
Figure 14:
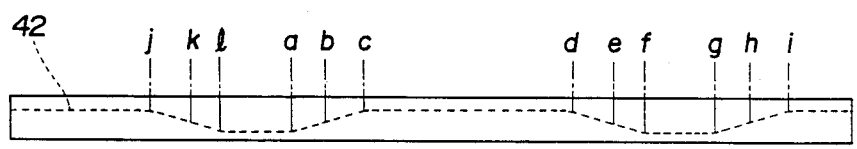
FIG. 14 is a schematic development of a grooved cam of the compound cam of FIG. 13.

The timing chart of FIG. 9 shows the vertical displacements and radial reciprocations of five pick-and-place units while the index table 25 undergoes a single intermittent displacement (i.e., the turning motion over 22.5°), as well as the relationship among the displacements and reciprocations. For the sake of convenience, the timing chart of only the pick-and-place unit designated at numeral 7a in FIG. 6 will be described using letters a–l. The letters a–l in FIGS. 4 and 5 correspond respectively to the letters a–l in FIG. 9. The remaining pick-and-place units indicated respectively by letters 7b–7e are mounted respectively at positions different from the mounting position of the pick-and-place unit 7a and undergo the same operations the timings of which are shifted from one another. Thus, description will be made on the unit 7a only and the other units will not be described to avoid repetition.

The pick-and-place unit 7a illustrated in FIGS. 6 and 7 assumes a position in the period i–j in FIG. 9. In the period i–j, the index table 25 is also in a stopped state. Since the first roller 10 is positioned in the first non-arcuate portion 8a of the grooved cam 8, the guide rod 15a is displaced inwardly in the radial direction as the compound cam 6 turns. At the same time, the guide rod 15b and block 16 are also displaced inwardly in the radial direction as unitary members with the guide rod 15a. In the above period, the bottom wall of the circular cam 9 is at the shallow portion (see, FIG. 5) which is a plane surface, thereby to locate the second roller 11 in the most-raised position. Accordingly, the mounting block 13 is held in the most-raised position. During this period, the chuck mounted on the block 16 conveys a work which has already been received from the feeder 30 in the preceding period. Incidentally, the index table 25 is kept in a stopped state from a certain time point in the period c–d to the time point a. Thus, the movement of the index table 25 will not be repeatedly described in each of the periods from the period c–d to the time point a. Since the first roller 10 is positioned near the end of the non-arcuate portion 8a in the period j–k, it is still being displaced inwardly in the radial direction. However, the second roller 11 enters a descending zone (i.e., tilted portion) of the circular cam 9 and starts to descend. Therefore, the block 16 undergoes a descending motion while moving inwardly in the radial direction during the period j–k. This is an intermediary motion of lowering a work conveyed from the period i–j toward a prescribed position on the table 25. In the period k–l, the first roller 10 enters the small-diametered arcuate portion 8b of the grooved cam 8. Thus, the radial displacement of the block 16 is stopped, but the second roller 11 still assumes the descending zone (tilted surface) of the circular cam 9 and thus undergoes continuous descending. The second roller 11 then reaches the most-lowered position at the time point l and stops its descending motion. During this period, the work held by the chuck, which is mounted on the block 16, is brought into contact with the prescribed position on the table 25. During the period l–a, the first roller 10 remains in the small-diametered arcuate portion 8b of the grooved cam 8 while the second roller 11 moves on the deep portion of the circular cam 9. Therefore, the block 16 is in a stopped state at the most inwardly-displaced and most-lowered position. During this period, the work is mounted at the prescribed position on the table 25 and is released there. In the section a–b, the first roller 10 is still in the small-diametered arcuate portion 8b but the second roller 11 enters the rising zone. Thus, the mounting block 16 starts to rise while still assuming the radially most-inward position. In this period, the block 16 starts to ascend without holding the work. As the block 16 starts to leave from the table 25 in the period a–b after the work has been mounted on the table in the course of the preceding periods k–a, the table 25 becomes turnable after the time point a and starts to turn counterclockwise at the time point a and then stops again after having turned over an angle of 22.5°. The timing of the 22.5° turning of the index table 25 should be determined so that periods X, during which the pick-and-place units 7a to 7d are in the radially-innermost and most-lowered positions to mount the works on the table 25, do not overlap with the period Y during which the table 25 turns.

In the period b–c, the first roller 10 enters the non-arcuate portion 8c while the second roller 11 is in the ascending zone. Therefore, the block 16 continues its ascending displacement while starting to move outwardly in the radial direction. In the period c–d, the first roller 10 is in the non-arcuate portion 8c while the second roller 11 is in the shallow portion. Thus, the mounting block 16 moves continuously and outwardly in the radial direction while being kept in the most-raised position. In the period d–e, the first roller 10 is still on the non-arcuate portion 8c but the second roller 11 enters in the descending zone. Accordingly, the block 16 further continues its outward movement in the radial direction while starting to descend. In this period, the block 16 has already started its descending movement toward the feeder 30 before it reaches the radially outermost position where the feeder 30 is located (see, FIG. 8). In the period e–f, the first roller 10 enters the large-diametered arcuate portion 8d and the second roller 11 assumes a position in the descending zone. Accordingly, the block 16 continues its descending movement to a point over the feeder 30 while being kept in the radially outermost portion. In the period f–g (i.e. the period indicated by "Z" in FIG. 9), the first roller 10 is still in the large-diametered arcuate portion 8d and the second roller 11 is in the deep portion. Thus, the block 16 is in a stopped state at the radially outermost and lowered position, thereby permitting the chuck attached to the block 16 to receive a work from the feeder 30 and grasp the same. In the period g–h, the first roller 10 is in the large-diametered arcuate portion 8d while the second roller 11 enters the ascending zone. Accordingly, the block 16 starts to ascend while being kept in the outermost position. The chuck mounted on the block 16 continuously holds the work until the block 16 reaches the innermost and lowered position. In the period h–i, the first roller 10 enters in the non-arcuate portion 8a while the second roller 11 is still in the ascending zone. Thus, the block 16 moves inwardly in the radial direction while continuing its ascending mevement. This period continuously leads to the period i–j, and the above-mentioned motions are successively repeated in the above periods.

The pick-and-place units 7b–7d are each used to feed works in a manner similar to the unit 7a. The units perform the same pick-and-place motions with timings deferred by the same angles as the angular differences of their mounting positions. On the other hand, the unit 7e which serves to eject each work completed with its assembly and machining work grasps the work on the table 25 in the period X' corresponding to the period X for each of the work-feeding units 7a–7d, and ejects the work onto the ejection path 32 in the period Z' corresponding to the period Z for each of the units 7a–7d.

As has been described above, the working apparatus 31 such as assembly machines and/or machining apparatus carry out prescribed work on each work while the index table 25 is at a standstill. Such working apparatus 31 may be mounted on the upper surface of the fixed table 21 or disposed outside the fixed table 21.

In the compound cam 6 of the above-described preferred embodiment, the profiles of the grooved cam 8 and circular cam 9 are designed in such a manner that a single revolution of the compound cam 6 over 360° permits each output member, i.e. pick-and-place unit 7 to complete a single compound motion. However, the cam profiles may be changed in various ways. For example, they may be so constructed that each output member completes a single compound motion whenever the compound cam turns over 180°.

The above embodiment employed only a single piece compound cam. It is however feasible to arrange, if desired, plural pieces of compound cams parallelly on the continuous rotary axis without making the cam mechanism unduly large or complex, because the structure of each output member is simple. Such modification would make it possible to change the extent of motion of each output member belonging to a group connected to a certain compound cam different from the extent of motion of each output member in another group connected to another compound cam (in either one or both of the horizontal and vertical directions).

It is pointed out again that the base machine illustrated in FIGS. 6 and 7 is certainly a preferred example of application of the cam mechanism according to this invention but the application of this invention is not necessarily limited to the base machine. The present invention is effective in having an output member undergo a compound horizontal and vertical motion. Accordingly, the present invention may be successfully incorporated in a variety of machines and apparatus, in each of which an output member is required to undergo such a compound motion.

Some of the advantages derived from the present invention are as follows:

(1) Since the single piece of compound cam 6 causes the output member 7 to undergo the combined vertical and horizontal motion, and since the structure of the cam 6 per se is relatively simple, the entire mechanism may be reduced in both overall size and manufacturing cost. In addition, plural output members may be driven by the single piece compound cam 6. Therefore, the present cam mechanism is suitable particularly for use as drive means for pick-and-place units.

(2) The invention permits use of the cam 6 having a large diameter for greater ratio of the cam diameter to the stroke of the output member. Therefore, timing of the output member may be freely determined.

(3) The grooved cam 8 and the circular cam 9 both formed on the cam disc 6 serve directly to produce output. Thus, characteristics of the cams are well-reflected to the outputs in order to improve the motion and accuracy of the output member 7.

(4) In the preferred example of the present invention illustrated in FIGS. 6 and 7, it is possible to drive the compound cam 6, as well as the plurality of pick-and-place units 7, and index table 25 by the same and single drive source without interposing complex gears and/or motion-converting mechanism. Thus, the present invention may avoid the problem of size-up which conventional mechanisms receiving drive power for pick-and-place units from an external drive source have encountered, and may reduce the interaction with other equipment, such as work feeders, to the minimum level.

FIGS. 10 through 14 illustrate a cam mechanism according to the third embodiment of this invention. Different from the embodiment depicted in FIG. 1, a compound cam 40 in this embodiment has a grooved cam 41 only. The grooved cam 41 has the same cam profile as the grooved cam 8 of the first embodiment, however, as illustrated clearly in FIG. 14, the bottom wall 42 of the grooved cam 41 comprises shallow portions, deep portions and tilted portions. Thus, the bottom wall 42 has the same function as the circular cam 9 in the foregoing embodiments. Output members, for example, pick-and-place units 43 are each equipped with a single roller 45 attached to one end of a guide rod 44a. The roller 45 is in engagement with the grooved cam 41 and rolls while being kept in contact with the bottom wall 42. The guide rod 44a is supported displaceably in the horizontal direction by a sliding block 46 which is biased downwards by means of a spring 47. The spring 47 is fixedly secured at one end thereof to a fixed rod 48 which extends through the sliding block 46 and supports the latter displaceably up and down. Thus, each motion corresponding to the grooved cam 41 is transmitted to the guide rod 44a through the roller 45. The output member 43 includes another guide rod 44b for fixing a chuck-mounting block 49 on the distal ends of the pair of guide rods.

The operation of the thus-constructed cam mechanism is substantially the same as the operations of the above embodiments and its description is not repeated herein.

Similar to the above embodiments, the output member 43 is not necessarily limited to a pick-and-place unit. A variety of output members which are each required to undergo a compound motion consisting of two motions, one being a horizontal linear motion and the other a vertical linear motion, may each become a part of the cam mechanism. It will also be apparent that such a structure as illustrated in FIG. 7 may be added to the structure shown in FIG. 11.

Having now fully described the invention with reference to the preferred embodiments thereof, it will be apparent to one of ordinary skill in the art that many modifications and alterations can be made thereto without departing from the spirit or scope of the invention as set forth herein.

What is claimed is:

1. A cam mechanism comprising:
a continuous rotary shaft connected to a drive source and driven continuously and rotatively by said drive source;
a disc-shaped compound cam fixedly secured to said continuous rotary shaft and having formed thereon an endless groove and a circular groove, said endless groove comprising continuously arranged arcuate and non-arcuate groove portions, and said circular groove having a bottom wall comprising deep wall portions, shallow wall portions and tilted wall portions connecting said deep and shallow wall portions continuously; and
an output member including a fixed rod extending in the vertical direction, a sliding block supported displaceable up and down on said fixed row and biased downwardly, a guide rod supported slidably in the horizontal direction by said sliding block, a first roller secured to one end of said guide rod and rotatably engaged with said endless groove so as to move said guide rod in the horizontal direction, and a second roller secured to said sliding block and rotatably engaged with said circular groove while being kept in contact with said bottom wall thereof so as to move said sliding block in the vertical direction.

2. A cam mechanism as claimed in claim 1, further comprising a chuck-mounting block fixedly secured on the other end of said guide rod.

3. A cam mechanism as claimed in claim 1, wherein said continuous rotary shaft is disposed rotatably within the interior of a fixed hollow sleeve, a support table is fixed on one end of said fixed hollow sleeve, and said support table supports said output member.

4. A cam mechanism as claimed in claim 3, further comprising an intermittent rotary shaft, intermittently rotated by intermittent drive means, rotatably supported outside said fixed hollow sleeve, and an index table fixed on said intermittent rotary shaft.

5. A cam mechanism as claimed in claim 4, wherein said intermittent drive means comprises a solid cam having a rib on the outer peripheral surface thereof and driven by the same drive source as said continuous rotary shaft, said intermittent rotary shaft having a hollow turret as a unitary member, a plurality of cam followers being secured with the same interval on the outer peripheral surface of said turret, and said cam followers rotating along said rib while being kept in contact with said rib.

6. A cam mechanism comprising:
a continuous rotary shaft connected to a drive source and driven continuously and rotatively by said drive source, said continuous rotary shaft being disposd rotatably within the interior of a fixed hollow sleeve;
cam means secured fixedly with said continuous rotary shaft and adapted to convert each continuous rotary rotion of said continuous rotary shaft to a compound horizontal and vertical motion, said cam means comprising a disc-shaped compound cam having in an upper surface thereof an endless groove formed of continuously-arranged arcuate and non-arcuate groove portions and an endless guide means having a depth which varies continuously from said upper surface of said compound cam;
an output member coupled with said cam means and adapted to receive said compound horizontal and vertical motion transmitted thereto, said output member being supported displaceably in the horizontal and vertical directions relative to said compound cam and including at least one roller engaged with said groove and said guide means of said compound cam;
a support table fixed on one end of said fixed hollow sleeve, and supporting said output member; and
an intermittent rotary shaft, intermittently rotated by intermittent drive means, rotatably supported outside said fixed hollow sleeve with an index table fixed on said intermittent rotary shaft, said intermittent drive means comprising a solid cam having a rib on the outer peripheral surface thereof and driven by the same drive source as said continuous rotary shaft, said intermittent rotary shaft having a hollow turret as a unitary member, a plurality of cam followers being secured with the same interval on the outer peripheral surface of said turret, and said cam followers rotating along said rib while being kept in contact with said rib.

7. A cam mechanism as claimed in claim 6, wherein said guide means of said compound cam comprises a bottom wall of said groove, said bottom wall having deep wall portions, shallow wall portions and tilted wall portions connecting said deep and shallow wall portions continuously, and said output member has one roller, said roller being in rotatable engagement with said groove while being maintained in contact with said bottom wall.

8. A cam mechanism as claimed in claim 7, wherein said output member further includes a fixed rod extending in the vertical direction, a sliding block supported displaceably up and down on said fixed rod and biased downwardly, and a guide rod supported slidably in the horizontal direction by said sliding block, said roller being attached to one end of said guide rod.

9. A cam mechanism as claimed in claim 8, further comprising a chuck-mounting block fixedly secured on the other end of said guide rod.

* * * * *